(12) United States Patent
Yoon et al.

(10) Patent No.: US 9,022,635 B2
(45) Date of Patent: May 5, 2015

(54) LIGHT GUIDE PLATE AND BACKLIGHT UNIT

(75) Inventors: Jun-Bo Yoon, Daejeon (KR);
Joo-Hyung Lee, Daejeon (KR);
Jeong-Ho Yeon, Daejeon (KR)

(73) Assignee: Korea Advanced Institute of Science and Technology (KR)

( * ) Notice: Subject to any disclaimer, the term of this patent is extended or adjusted under 35 U.S.C. 154(b) by 405 days.

(21) Appl. No.: 13/512,750

(22) PCT Filed: Nov. 30, 2010

(86) PCT No.: PCT/KR2010/008536
§ 371 (c)(1),
(2), (4) Date: Sep. 24, 2012

(87) PCT Pub. No.: WO2011/065806
PCT Pub. Date: Jun. 3, 2011

(65) Prior Publication Data
US 2013/0188392 A1    Jul. 25, 2013

(30) Foreign Application Priority Data
Nov. 30, 2009    (KR) .................... 10-2009-0116907

(51) Int. Cl.
*F21V 7/04* (2006.01)
*F21V 8/00* (2006.01)
(52) U.S. Cl.
CPC ............ *G02B 6/0011* (2013.01); *G02B 6/0036* (2013.01); *G02B 6/0038* (2013.01)

(58) Field of Classification Search
CPC .. G02B 6/0011; G02B 6/0036; G02B 6/0035; G02B 6/0038
USPC ................ 362/311.12, 296.1, 600, 610, 615; 349/62, 63, 67
See application file for complete search history.

(56) References Cited

U.S. PATENT DOCUMENTS

| | | | |
|---|---|---|---|
| 7,489,304 B2 * | 2/2009 | Nakazawa et al. | 345/173 |
| 8,358,266 B2 * | 1/2013 | Khazeni et al. | 345/108 |
| 2001/0019479 A1 | 9/2001 | Nakabayashi | |
| 2003/0058383 A1 | 3/2003 | Jagt et al. | |
| 2008/0267572 A1 * | 10/2008 | Sampsell et al. | 385/129 |

FOREIGN PATENT DOCUMENTS

| | | | |
|---|---|---|---|
| JP | 09211451 | 8/1997 | |
| JP | 09211451 A * | 8/1997 | ............ G02F 1/1335 |

* cited by examiner

*Primary Examiner* — Nimeshkumar Patel
*Assistant Examiner* — Kevin Quarterman
(74) *Attorney, Agent, or Firm* — The Belles Group, P.C.

(57) ABSTRACT

Disclosed are a light guide plate and a backlight unit. The backlight unit according to the present invention includes: a light guide plate; a light source disposed on one side of the light guide plate; and a reflective plate disposed under the light guide plate, wherein, in the cross section of one side of the light guide plate, the light guide plate includes a plurality of unit slits including a first slit and a second slit, wherein the first slit and the second slit are inclined from a top surface toward the inside of the light guide plate with respect to a vertical direction of the top surface, and wherein the first slit and the second slit are symmetrical to each other with respect to the middle portion of the unit slit.

15 Claims, 19 Drawing Sheets

ND BACKLIGHT
LIGHT GUIDE PLATE AND BACKLIGHT UNIT

CROSS-REFERENCE TO RELATED PATENT APPLICATIONS

The present application is a U.S. national stage application under 35 U.S.C. §371 of PCT Application No. PCT/KR2010/008536, filed Nov. 30, 2010, which claims prior to Korean Patent Application No. 10-2009-0116907, filed Nov. 30, 2009, the entireties of which are incorporated herein by reference.

TECHNICAL FIELD

The present invention relates to a light guide plate and a backlight unit.

BACKGROUND ART

An information display device functioning as an information transfer path between machines and human has been rapidly developed based on an advanced manufacturing technology and electronic information industry. Particularly, a liquid crystal display (hereinafter, referred, to as LCD) using liquid crystal has been rapidly growing for the last ten years on the basis of a high-leveled semiconductor process technology and industrial infrastructures, and then nowadays acquires very wide application product groups and occupies the most powerfully its related market share.

The LCD is what is called a non-self-emissive type LCD which does not emit light by itself. Therefore, the LCD should necessarily include another light source and provide light to a display panel in order to display images. Many LCDs, which are now being provided to the market, display images by including Backlight Units (BLU) as light sources placed at a back side of the panel and by selectively transmitting or blocking light emitted from the backlight units. As such, the backlight unit being placed at the back side of the panel and providing light to the display device determines main factors of the LCD, for example, power consumption, image quality, thickness and price and so on.

The backlight unit can be configured in various shapes in accordance with a size of a finished product, use, desired brightness and the like. Here, a structure of the backlight unit to be used in a portable information display device includes a point light source and a line light source such as a Light Emitting Diode (LED) or a Cold Cathode Fluorescent Lamp (CCFL), a Light guide plate (LGP) uniformly emitting light emitted from the point light source and the line light source over the entire surface of the panel and changing into a surface light source, a prism sheet correcting an orientation angle and a spatial uniformity of the light emitted from the light guide plate, and a diffuser sheet and the like.

Here, the light guide plate changing the light coming from the lateral side thereof into a surface light source emits the light upward by means of a very small sized structure formed on the top surface or the bottom surface of the light guide plate. The shape of the structure plays an important role of determining the orientation angle and luminance of light emitted from the light guide plate. A light emitting structure of the light guide plate proposed in a conventional technology includes a micro lens, a micro prism, a straight line shaped projection and a curved line shaped projection, etc. However, the light emitted from such a structure has a very low light emitting efficiency, so that a ratio of luminance to power consumption is not high. The light emitted from such a structure usually does not proceed vertically, so that light path should be corrected through a separate prism sheet. Therefore, these are major causes of increasing the whole thickness and price of the display device and of reducing power efficiency of the display device.

FIG. 1 is a perspective view showing a structure of a backlight unit (BLU) according to a conventional technology. FIG. 2 is a cross sectional view showing the backlight unit according to the conventional technology. FIG. 3 is a perspective view showing a structure of a light guide plate being disposed on the backlight unit according to a conventional technology and including a lens-shaped projection on the top surface thereof. FIG. 4 is a perspective view showing a structure of a light guide plate being disposed on the backlight unit according to a conventional technology and including a pyramid-shaped projection on the top surface thereof.

As shown in FIGS. 1 and 2, a backlight unit 100 according to the conventional technology includes a light source 110, a light guide plate (LGP) 120 receiving light emitted from the light source 110 and propagating the light, a diffuser sheet 130 correcting the characteristic of the light emitted from the light guide plate, a prism sheet 140 and other optical functional sheets and protective films.

FIGS. 1 and 2, the operation of the backlight unit according to the conventional technology will be described. After light 111 emitted from the light source 110 is incident on one side of the light guide plate 120, the light is propagated without being emitted outward due to optical total internal reflection occurring at an interface between mediums having mutually different refractive indexes.

As shown in FIGS. 3 and 4, the light guide plate installed in the backlight unit according to the conventional technology includes a particular projection structure having a shape of a lens 123 or a pyramid 123' on the top surface or bottom surface thereof. The projection structure causes the light to be emitted upward from the inside of the light guide plate 120.

Here, when the projection structures 123 and 123' i.e., a light emitting pattern including a peculiarly shaped unevenness formed on a top surface 121 or a bottom surface 122 thereof are formed, a total internal reflection condition is not satisfied at a certain corresponding position. Therefore, the incident light may be emitted outward.

Since the light 112 emitted outward originally tends to emit toward the opposite side to that of the light source, the prism sheet 140 formed vertically and horizontally is required to make the direction of the light to be perpendicular to the surface of the display device.

In order to remove a pattern generated from the light emitting pattern formed on the top surface 121 or the bottom surface 122 of the light guide plate, a scattering sheet or a diffuser sheet 130 should be included.

As such, the backlight unit including the conventional light guide plate 120 is required to additionally include the multilayered optical sheets 130 and 140. Therefore, there is a problem in that large losses are expected in terms of production cost, thickness and optical luminous efficiency.

FIGS. 5 to 8 are views of optical simulation results showing a light emission characteristic of the backlight unit light guide plate employing a conventional prism structure or lens structure. FIGS. 5 and 6 show angular luminance charts for the light emission characteristic of the backlight unit employing the conventional prism structure (referred to as a pyramid structure in FIG. 5) or lens structure. FIGS. 7 and 8 show spatial luminance charts of the backlight unit employing the conventional prism structure or lens structure.

As shown in FIGS. 5 and 6, since the light guide plate employing the conventional prism structure or lens structure has very low vertical light emitting efficiency, required necessarily is a separate optical sheet which corrects light having very low vertical light emitting efficiency to be perpendicular to the light guide plate.

As shown in FIGS. 7 and 8, the light guide plate employing the conventional prism structure or lens structure has generally low spatial luminance distribution.

DISCLOSURE OF INVENTION

Technical Problem

The present invention aims at providing a light guide plate and a backlight unit capable of improving light emitting efficiency of the light guide plate by forming patterns with various slit structures on the top surface of or within the light guide plate of the backlight unit.

The present invention aims at providing a light guide plate and a backlight unit having excellent vertical light emission performance and high luminance by forming a single-layered optical sheet of the backlight unit.

The present invention aims at providing a light guide plate and a backlight unit allowing the manufacturing cost of a display panel to be reduced by manufacturing a lightened and thinner display panel through formation of a single-layered optical sheet of the backlight unit.

Solution To Problem

According to one aspect of the present invention, a backlight unit comprises a light guide plate; a light source disposed on one side of the light guide plate; and a reflective plate disposed under the light guide plate, wherein the light guide plate comprises a plurality of unit slits comprising a first slit and a second slit, wherein, in the cross section of one side of the unit slit, the first slit and the second slit are inclined from a top surface of the Sight guide plate toward the inside of the light guide plate with respect to a vertical direction of the top surface, and wherein the first slit and the second slit are symmetrical to each other with respect to the middle portion of the unit slit.

According to another aspect of the present invention, a backlight unit comprises a light guide plate; a light source disposed on one side of the fight guide plate; and a reflective plate disposed under the light guide plate, wherein the inside of the light guide plate comprises a plurality of unit slits comprising a first slit and a second slit, wherein, in the cross section of one side of the unit slit, the first slit and the second slit are inclined from upper side to bottom side of the light guide plate with respect to a vertical direction of the top surface of the light guide plate, and wherein the first slit and the second slit are symmetrical to each other with respect to the middle portion of the unit slit.

According to another aspect of the present invention, the unit slit has at least one shapes among a line shape, a circular shape, a polygonal shape, a shape of an irregular closed curve and a crescent shape on the top surface of the light guide plate.

According to another aspect of the present invention, each of the line shape, circular shape, polygonal shape, shape of an irregular closed curve and crescent shape is segmented within itself.

According to another aspect of the present invention, in the light guide plate, the farther it is from the light source, the less a distance between one unit slit and unit slit adjacent to the one unit slit is.

According to another aspect of the present invention, in the light guide plate, the farther it is from the light source, the greater the height of a unit slit is.

According to another aspect of the present invention, internal widths of the first slit and the second slit are constant.

According to another aspect of the present invention, in the first slit and the second slit, upper widths are greater or less than lower widths.

According to another aspect of the present invention, the light guide plate comprises at least one of Poly Methyl-MethacrylAte (PMMA), Poly Carbonate (PC), PolyDiMethylSiloxane (PDMS).

According to another aspect of the present invention, the unit slit is formed on the bottom surface of the light guide plate.

According to another aspect of the present invention, the top surface of the light guide plate is inclined downward toward the opposite side to the light source.

According to another aspect of the present invention, a distance between the top surface of the light guide plate and the unit slit is reduced toward the opposite side to the light source.

According to another aspect of the present invention, the light guide plate comprises a plurality of multi-layered unit slits.

According to another aspect of the present invention, the unit slit is filled with a material having a different refractive index from that of the light guide plate.

According to another aspect of the present invention, a diffuser sheet or a scattering sheet is disposed over the light guide plate.

According to another aspect of the present invention, a reflective plate is disposed on the other side of the light guide plate.

According to another aspect of the present invention, the light source is a cold cathode fluorescent lamp or a light emitting diode.

According to another aspect of the present invention, a backlight unit comprises a light guide plate; a light source disposed on one side of the light guide plate; and a reflective plate disposed under the light guide plate, wherein the light guide plate comprises a plurality of unit slits comprising a first slit and a second slit, wherein, in the cross section of one side of the unit slit, the first slit and the second slit are curved from a bottom surface toward the inside of the light guide plate with respect to a vertical direction of the bottom surface, and wherein the first slit and the second slit are symmetrical to each other with respect to the middle portion of the unit slit.

According to another aspect of the present invention, a backlight unit comprises a light guide plate; a light source disposed on one side of the light guide plate; and a reflective plate under the light guide plate, wherein the inside of the light guide plate comprises a plurality of unit slits comprising a first slit and a second slit, wherein, in the cross section of one side of the unit slit, the first slit and the second slit are curved from upper side to bottom side of the light guide plate with respect to a vertical direction of the top surface of the light guide plate, and wherein the first slit and the second slit are symmetrical to each other with respect to the middle portion of the unit slit.

According to another aspect of the present invention, a backlight unit comprises a light guide plate; a light source disposed on one side of the light guide plate; and a reflective plate disposed under the light guide plate, wherein the light guide plate comprises a plurality of unit slits which, in the cross section of one side of the unit slit, are parallel with each other and are inclined from a top surface of the light guide plate toward the inside of the light guide plate with respect to a vertical direction of the top surface.

According to another aspect of the present invention, a backlight unit comprises a light guide plate; a light source disposed on one side of the light guide plate; and a reflective plate disposed under the light guide plate, wherein the inside of the light guide plate comprises a plurality of unit slits which, in the cross section of one side of the unit slit, are parallel with each other and are inclined from upper side to bottom side of the light guide plate with respect to a vertical direction of the top surface.

According to another aspect of the present invention, a backlight unit comprises a light guide plate; and a light source disposed on one side of the light guide plate; wherein the light guide plate comprises a plurality of unit slits comprising a first slit and a second slit, wherein, in the cross section of one side of the unit slit, the first slit and the second slit are inclined from a top surface of the light guide plate toward the inside of the light guide plate with respect to a vertical direction of the top surface, and wherein the first slit and the second slit are symmetrical to each other with respect to the middle portion of the unit slit.

According to another aspect of the present invention, the light guide plate is made of an elastic material.

According to another aspect of the present invention, a light guide plate comprises a plurality of unit slits comprising a first slit and a second slit, wherein, in the cross section of one side of the unit slit, the first slit and the second slit are inclined from a top surface of the light guide plate toward the inside of the light guide plate with respect to a vertical direction of the top surface, and wherein the first slit and the second slit are symmetrical to each other with respect to the middle portion of the unit slit.

According to another aspect of the present invention, a light guide plate comprises a plurality of unit slits inside the light guide plate, wherein the unit slits comprise a first slit and a second slit, and wherein, in the cross section of one side of the unit slit, the first slit and the second slit are inclined from upper side to bottom side of the light guide plate with respect to a vertical direction of the lop surface of the light guide plate, and are symmetrical to each other with respect to the middle portion of the unit slit.

According to another aspect of the present invention, a light guide plate comprises a plurality of unit slits comprising a first slit and a second slit, wherein, in the cross section of one side of the unit slit, the first slit and the second slit are curved from a bottom surface toward the inside of the light guide plate with respect to a vertical direction of the bottom surface, and wherein the first slit and the second slit are symmetrical to each other with respect to the middle portion of the unit slit.

According to another aspect of the present invention, a light guide plate comprises a plurality of unit slits inside the light guide plate, wherein the unit slits comprise a first slit and a second slit, and wherein, in the cross section of one side of the unit slit, the first slit and the second slit are curved from upper side to bottom side of the light guide plate with respect to a vertical direction of the top surface of the light guide plate, and are symmetrical to each other with respect to the middle portion of the unit slit.

According to another aspect of the present invention, a light guide plate comprises a plurality of unit slits which, in the cross section of one side of the unit slit, are parallel with each other and are inclined from a top surface of the light guide plate toward the inside of the light guide plate with respect to a vertical direction of the top surface.

According to another aspect of the present invention, a light guide plate comprises a plurality of unit slits inside the light guide plate, wherein, in the cross section of one side of the unit slit, the unit slits are parallel with each other and are inclined from upper side to bottom side of the light guide plate with respect to a vertical direction of the top surface.

Advantageous Effects of Invention

According to the present invention, through patterns with various slit structures formed on the top surface of or within the light guide plate of the backlight unit, light emitting efficiency from the light guide plate can be improved.

According to the present invention, through a single-layered optical sheet of the backlight unit, excellent vertical light emission performance and high luminance can be obtained.

According to the present invention, through a single-layered optical sheet of the backlight unit, it is possible to manufacture a lightened and thinner display panel and to reduce the manufacturing cost of a display panel.

Details as well as the aforesaid technical problem, technical solution and advantageous effects are included in the following detailed descriptions and drawings. The features, advantages and method for accomplishment of the present invention will be more apparent from referring to the following detailed embodiments described as well as the accompanying drawings. The same reference numerals throughout the disclosure correspond to the same elements.

MODE FOR THE INVENTION

Hereinafter, an embodiment of the present invention will be described in detail with reference to the accompanying drawings. The accompanying drawings are intended only for more easily describing the contents of the present invention. Moreover, it can be easily understood by those skilled in the art that the spirit and scope of the present invention is not limited to those of the accompanied drawings.

Figure 9:
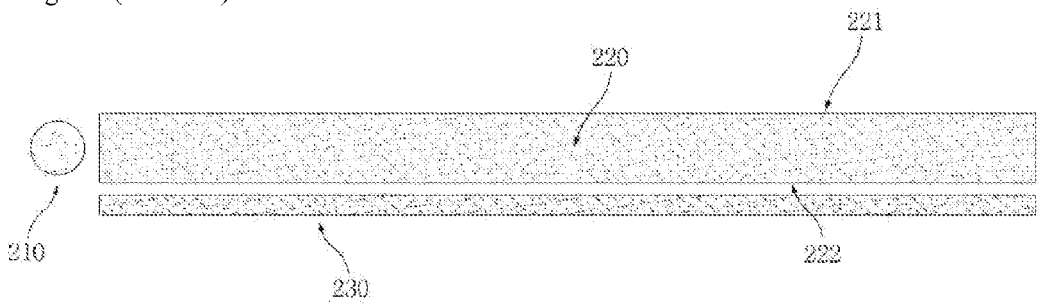
FIG. 9 is a cross sectional view showing a structure of a backlight unit according to an embodiment of the present invention.

FIG. 9 is a cross sectional view showing a structure of a backlight unit according to the present invention.

As shown in FIG. 9, the backlight unit according to the present invention includes a light guide plate 220 made of a plastic material, a light source 210 placed on one side of the light guide plate 220, and a reflective plate 230 placed under the light guide plate 220.

The light source 210 is disposed on one side of the light guide plate 220 and emits light by using a point light source or a line light source such as a Light Emitting Diode (hereinafter, referred to as LED) or a Cold Cathode Fluorescent Lamp (hereinafter, referred to as CCFL) and the like.

The light guide plate 220 is disposed on one side of the light source 210 and emits light incident from the light source 210 to the top and bottom surfaces thereof and lateral surface thereof and so on. The light guide plate 220 is made up of a transparent flexible material such as at least one of Poly Methyl MethacrylAte (PMMA), Poly Carbonate (PC), Poly-DiMethylSiloxane (PDMS). Though not shown, a top surface 221 or a bottom surface 222 of the light guide plate 220 includes a various shaped optical path change means (hereinafter, referred to as a unit slit) having a minute-sized micro pattern in order to change the path of the light incident from the light source 210 and to allow the light to emit to the upper or lower part of the light guide plate 220. Here, the various shaped unit slit will be described in more detail in description of FIGS. 10 to 50.

The reflective plate 230 is placed under the light guide plate 220 and reflects or re-reflects the light incident from the light source 210 to the upper part of the light guide plate 220.

The backlight unit configured as described above can be, in particular, used as a light source for various kinds of non-light emissive displays including a liquid crystal display (LCD) and electronic paper.

Figure 10:
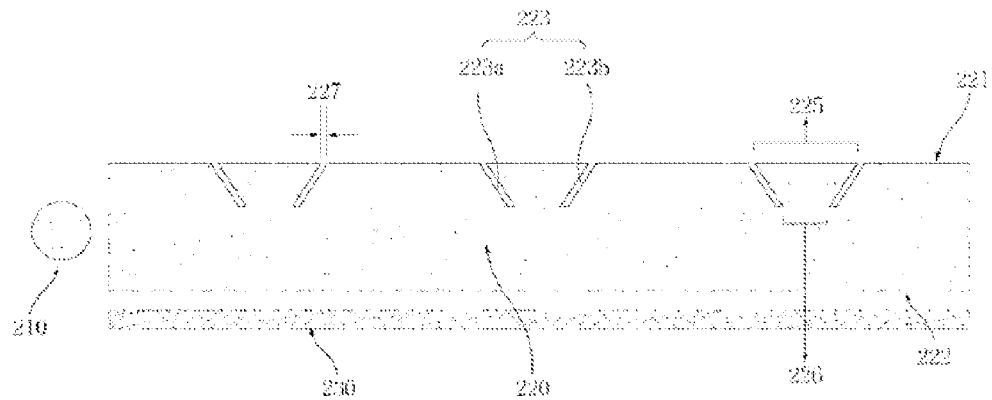
FIG. 10 is a cross sectional view showing a structure of a backlight unit according to a first embodiment of the present invention.
Figure 11:
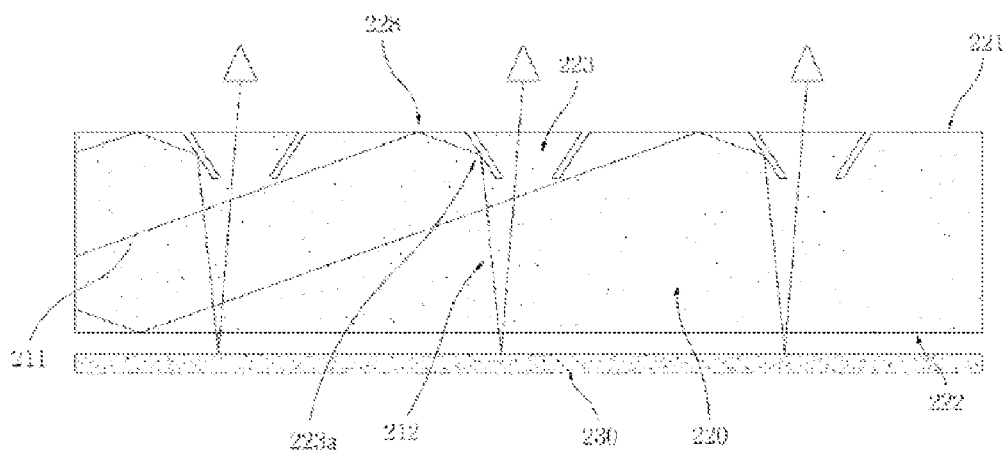
FIG. 11 is a view showing a principle of light emission from the backlight unit of FIG. 10.
Figure 12:
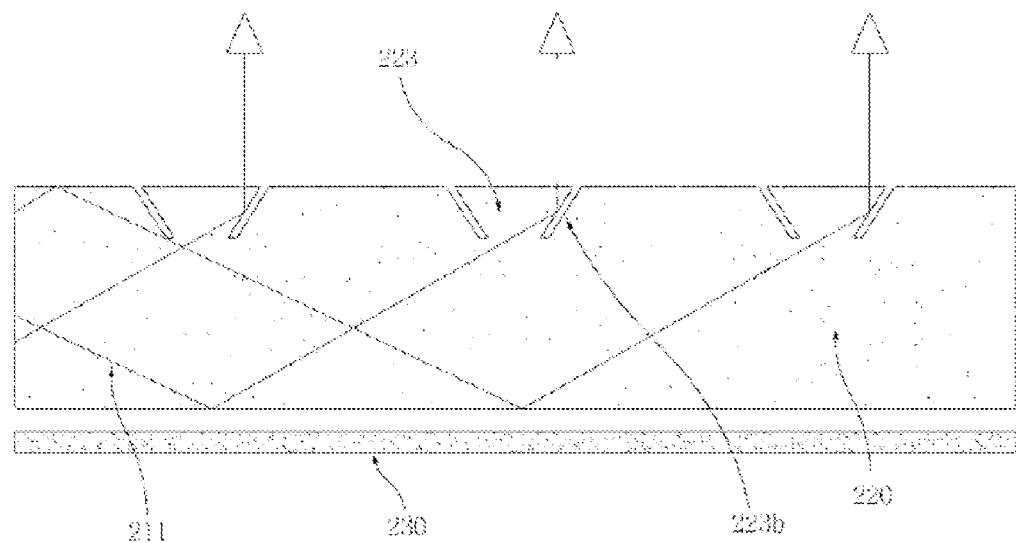
FIG. 12 is a view showing a principle in which light is emitted in a different way from that of FIG. 11.

FIG. 10 is a cross sectional view showing a structure of a backlight unit according to a first embodiment of the present invention. FIG. 11 is a view showing a principle of light emission from the backlight unit of FIG. 10. FIG. 12 is a view showing a principle in which light is emitted in a different way from that of FIG. 11.

As shown in FIG. 10, the backlight unit according to the first embodiment of the present invention includes a plurality of unit slits 223 including a first slit 223a and a second slit 223b, each of which is formed on the top surface 221 of the light guide plate 220.

As light propagating within the light guide plate 220 is incident on the unit slit 233 and total reflection occurs, the unit slit 233 functions to deflect the light upward or downward from the light guide plate 220. The unit slit 233 includes the first slit 223a and the second slit 223b. In the cross section of one side of the unit slit 233, the first slit 223a and the second slit 223b are inclined from the top surface 221 toward inside of the light guide plate 220 with respect to a vertical direction of the top surface 221. At the same time, the first slit 223a and the second slit 223b are symmetrical to each other with respect to the middle portion of the unit slit 223. That is, the unit slit 233 includes the parallel straight-line shaped first and the second slits 223a and 223b which are inclined and face each other as viewed from the side cross section of the light guide plate 220. Further, the first slit 223a and the second slit 223b are designed such that a distance 225 between them in the proximity of the top surface 221 is larger than a distance 226 between them inside the light guide plate. For example, though it is desirable that a width 227 between the first slit 223a and the second slit 223b is several μm, the width 227 may be designed larger or less than several μm according to the purpose and use of the backlight unit.

As shown in FIG. 11, the light is emitted from the backlight unit of FIG. 10 in accordance with the following principle. When light 211 propagating within the light guide plate 220 is incident on an area 228 including no optical path change means, the light is totally reflected and propagates within the light guide plate 220 whenever the light is incident on the top surface 221 and the bottom surface 222.

After the light 211 propagating within the light guide plate is incident on the top surface 221 or the bottom surface 222 of the light guide plate 220 and is totally reflected, the light 211 reaches the first slit 223a and is totally reflected again, and then is deflected downward. Here, the light 212 deflected downward is incident on the reflective plate 230 placed under the light guide plate 220, and then is reflected again to the upper part of the light guide plate 220. As a result, the light is emitted in a direction close to a perpendicular direction with respect to the light guide plate.

Light shown in FIG. 12 is emitted in a different way from that of FIG. 11, When the light 211 propagating within the light guide plate 220 is incident between the unit slits 223 and reaches the second slit 223b, the light is totally reflected at the surface of the second slit 223b. As a result, the light is emitted vertically to the outside of the light guide plate 220.

As described above, when light is incident on a pair of unit slits 223 having a negative or a positive inclination with respect to a direction perpendicular to the light guide plate 220, the backlight unit according to the present invention can allow the light to be deflected vertically upward and downward from the light guide plate 220. Moreover, through the backlight unit according to the present invention, the light deflected vertically downward is reflected by the reflective plate 230 and is deflected vertically upward. Accordingly, excellent emission performance of vertically upward light may be expected.

Figure 13:
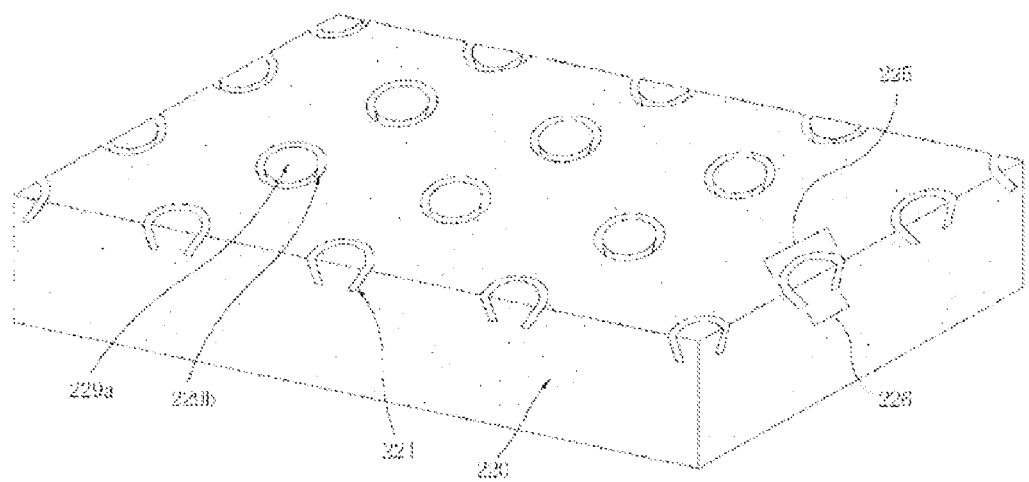
FIG. 13 is a perspective view showing a structure of the backlight unit according to the first embodiment of the present invention.

FIG. 13 is a perspective view showing a structure of the backlight unit according to the first embodiment of the present invention.

As shown in FIG. 13, the backlight unit according to the first embodiment of the present invention includes a plurality of unit slits 229b which include circular frames 229a and are formed apart from each other at a predetermined interval in the light guide plate 220 as they are sees from the top of the light guide plate 220.

Here, a diameter of a unit slit 229b at the surface of the light guide plate 220 is required to be larger than that of the unit slit 229b at internal of the light guide plate 220.

FIGS. 14 to 18 are views showing various shapes of a unit slit formed on the top surface of a light guide plate of the backlight unit according to the first embodiment of the present invention. FIG. 19 is a perspective view showing a linear unit slit formed on the top surface of the light guide plate of the backlight unit according to the first embodiment of the present invention.

Figure 14:
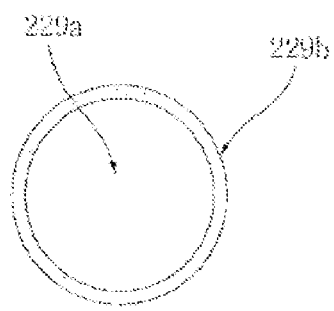
FIGS. 14 to 18 are views showing various shapes of a unit slit formed on the top surface of a light guide plate of the backlight unit according to the first embodiment of the present invention.
Figure 15:
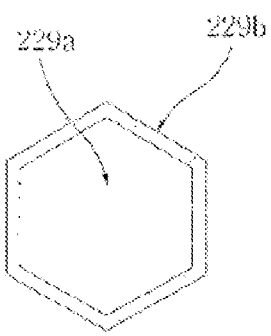
Figure 16:
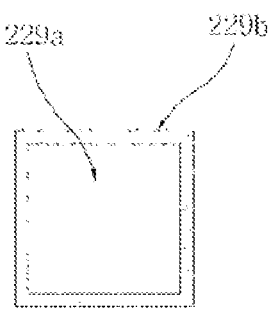
Figure 17:
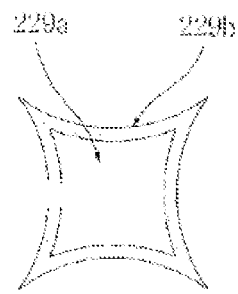
Figure 18:
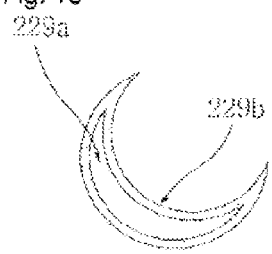
Figure 19:
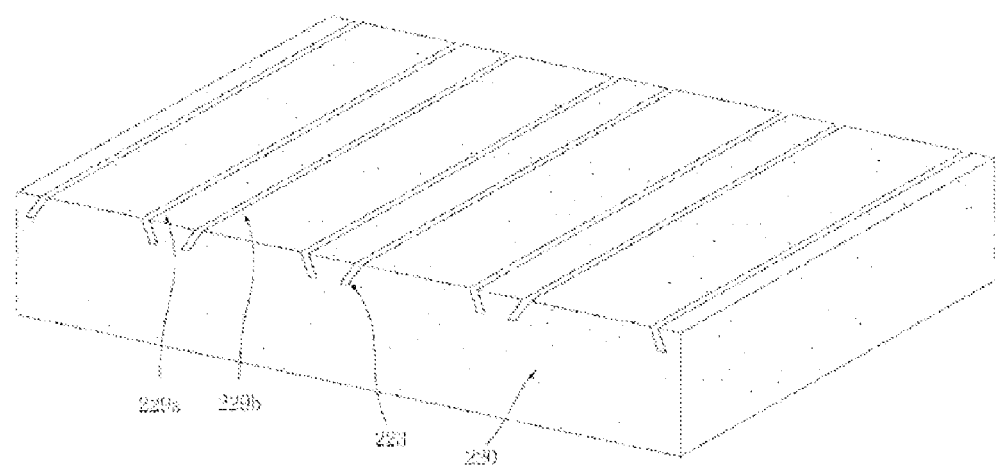
FIG. 19 is a perspective view showing a linear unit slit formed on the top surface of the light guide plate of the backlight unit according to the first embodiment of the present invention.

As shown in FIGS. 14 to 19, the unit slit 229b on the top surface of the light guide plate according to the first embodiment of the present invention has a circular shape of FIG. 14, a polygonal shape (for example, a hexagonal shape of FIG. 15 and a quadrangular shape of FIG. 16), a shape of an irregular closed curve of FIG. 17, a crescent shape of FIG. 18 and a straight line shape of FIG. 19. The top surface of the unit slit 229 can have other shapes as well as the shapes mentioned above.

Figure 20:
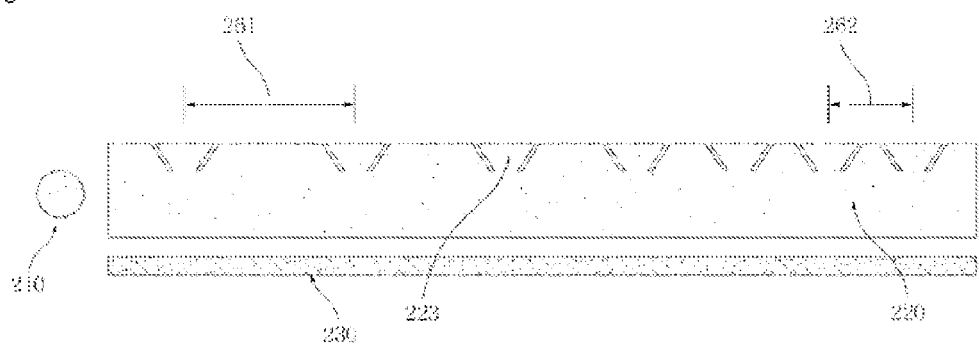
FIG. 20 is a cross sectional view showing a modified embodiment of changing a gap between unit slits of the light guide plate according to the first embodiment of the present invention.

FIG. 20 is a cross sectional view showing a modified embodiment of changing a gap between unit slits of the light guide plate according to the first embodiment of the present invention.

As shown in FIG. 20, the farther it is from the light source 210, the less a distance between the unit slits 223 is. That is, the farther it is from the light source 210, the less a distance between the center of one unit slit and the center of unit slit adjacent to the one unit slit is. As a result, it is possible to obtain uniform emission performance of vertically upward light over the entire surface of the light guide plate 220.

Figure 21:
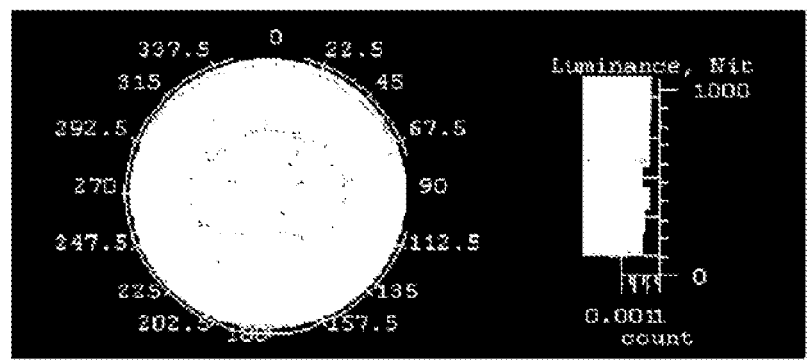
FIGS. 21 to 23 are views of optical simulation results showing a light emission characteristic of the backlight unit according to the first embodiment of the present invention.
Figure 22:
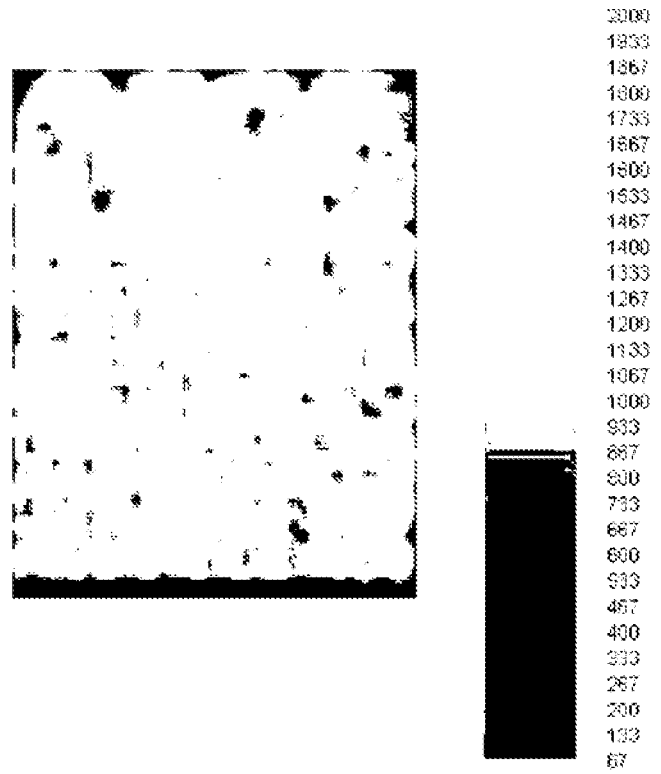
Figure 23:
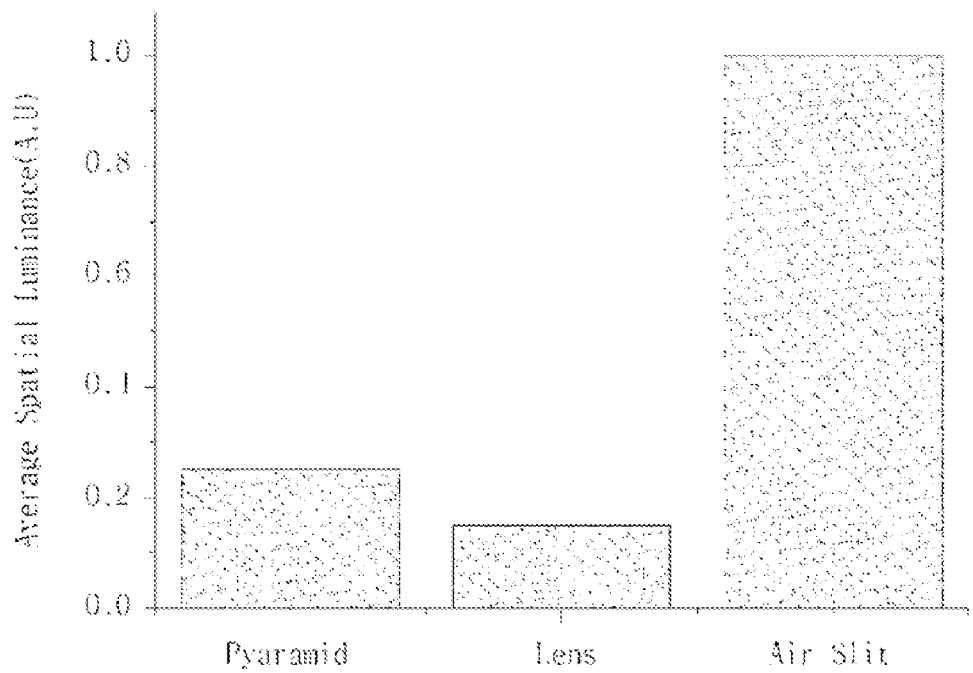

FIGS. 21 to 23 are views of optical simulation results showing a light emission characteristic of the backlight unit according to the first embodiment of the present invention. FIG. 21 employs an angular luminance chart among the light emission characteristics of the backlight unit according to the first embodiment of the present invention. FIG. 22 employs a spatial luminance chart among the light emission characteristics of the backlight unit according to the first embodiment of the present invention. FIG. 23 shows the light emission characteristic of the backlight unit including the unit slit (referred to as an air slit structure in FIGS. 21 to 23) by employing an average spatial luminance graph among the light emission characteristics of the backlight unit according to the first embodiment of the present invention.

Figure 1:
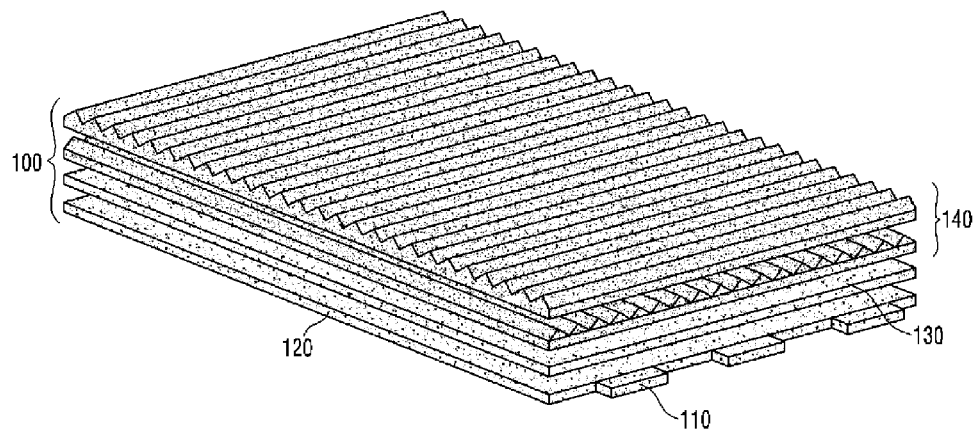
FIG. 1 is a perspective view showing a structure of a backlight unit according to a conventional technology.
Figure 2:
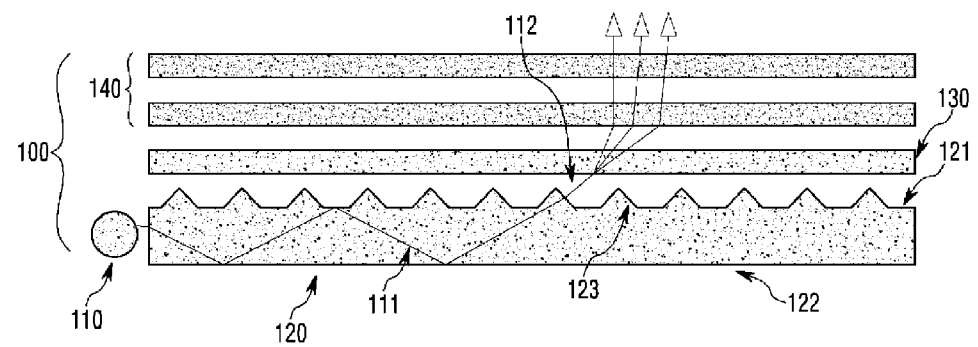
FIG. 2 is a cross sectional, view showing a structure of the backlight unit according to the conventional technology.
Figure 3:
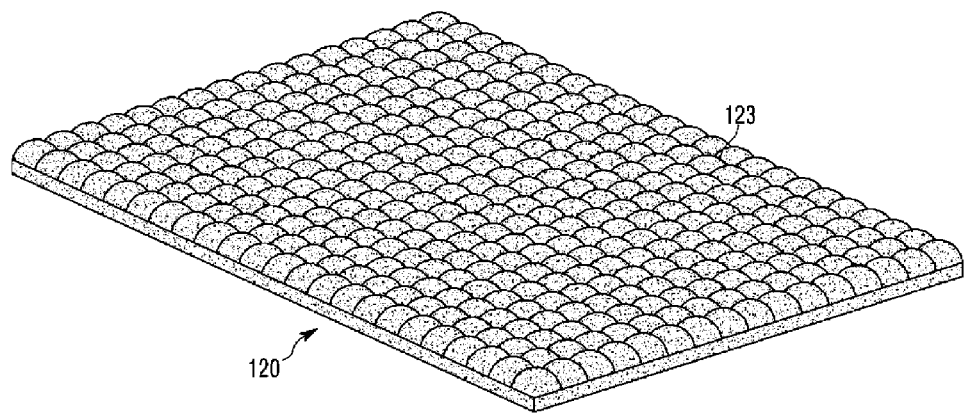
FIG. 3 is a perspective view showing a structure of a light guide plate being installed in the backlight unit according to the conventional technology and including a lens-shaped projection on the top surface thereof.
Figure 4:
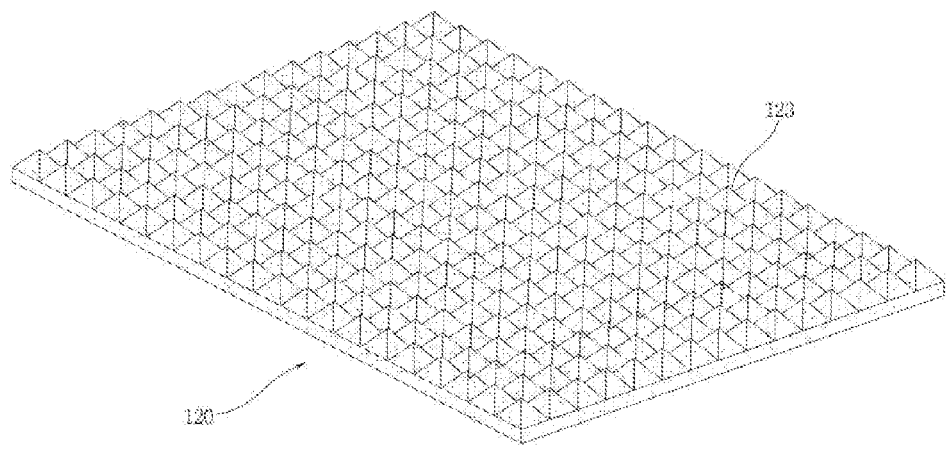
FIG. 4 is a perspective view showing a structure of a light guide plate being installed in the backlight unit according to the conventional technology and including a pyramid-shaped projection on the top surface thereof.
Figure 5:
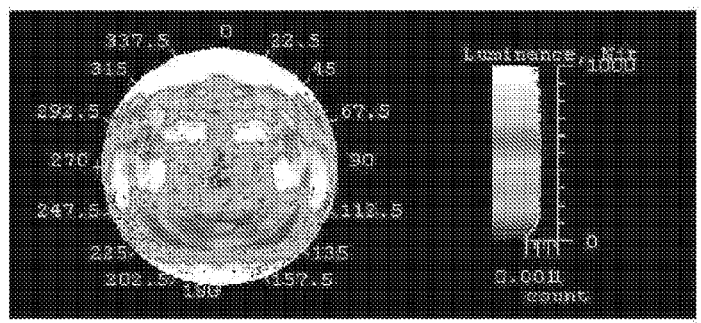
FIGS. 5 to 8 are views of optical simulation results showing a light emission characteristic of the backlight unit s light guide plate employing the conventional prism structure or lens structure.
Figure 6:
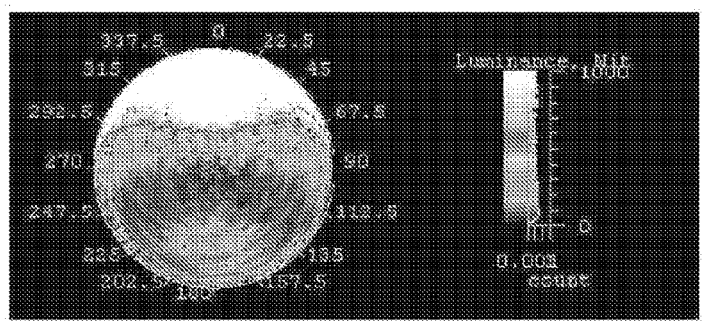

As described in FIGS. 5 and 6, a light guide plate employing a conventional prism structure and lens structure has a very low light vertical emission performance, so that a separate optical sheet is absolutely required in order to increase the light vertical emission performance. However, as shown in FIG. 21, the backlight unit according to the first embodiment of the present invention has excellent light vertical emission performance without a separate optical sheet.

Figure 7:
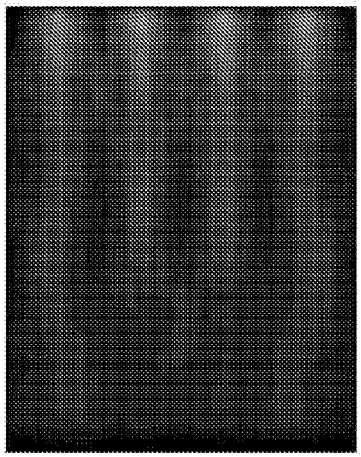
Figure 8:
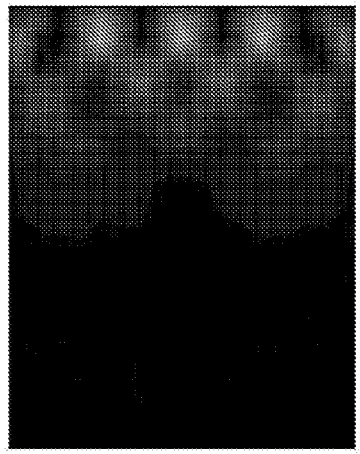

As described in FIGS. 7 and 8, a spatial luminance distribution of the light guide plate employing a conventional prism structure and lens structure is overall low. However, as shown in FIG. 22, the backlight unit according to the first embodiment of the present invention has very excellent spatial luminance distribution.

As shown in FIG. 23, compared with the average spatial luminance value of the light guide plate employing a conventional prism structure and lens structure, the average spatial luminance value of the backlight unit according to the first embodiment of the present invention shows that it is possible to obtain a very excellent light vertical emission performance. Here, the backlight unit is assumed to include a light guide plate having a uniform pattern distribution.

Figure 24:
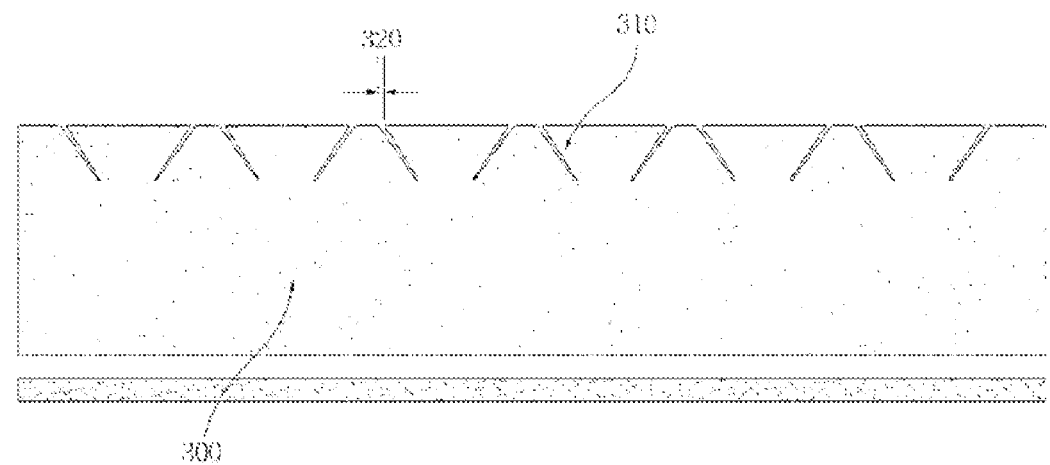
FIGS. 24 and 25 are cross sectional views showing a modified embodiment of a unit slit of a light guide plate of a backlight unit according to a second embodiment of the present invention.
Figure 25:
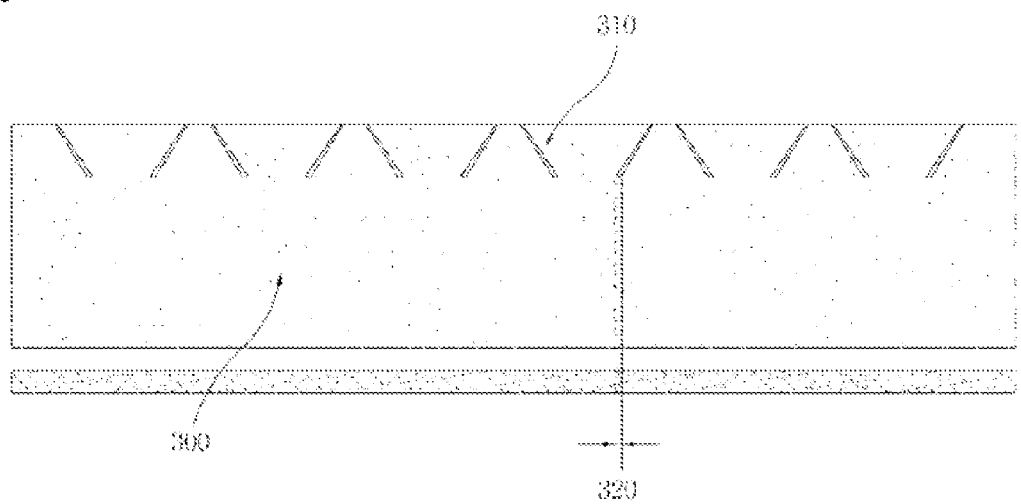

FIGS. 24 and 25 are cross sectional views showing a modified embodiment of a unit slit of a light guide plate of a backlight unit according to a second embodiment of the present invention.

As shown in FIG. 24, a distance 320 between interfaces of unit slit 310 formed in a light guide plate 300 of the backlight unit, that is to say, an internal width of the unit slit 310 can be configured to become narrower toward the inside of the light guide plate 300.

As shown in FIG. 25, the distance 320 between interfaces of unit slit 310 formed in the light guide plate 300 of the backlight unit can be configured to become less toward the top surface of the light guide plate 300.

Figure 26:
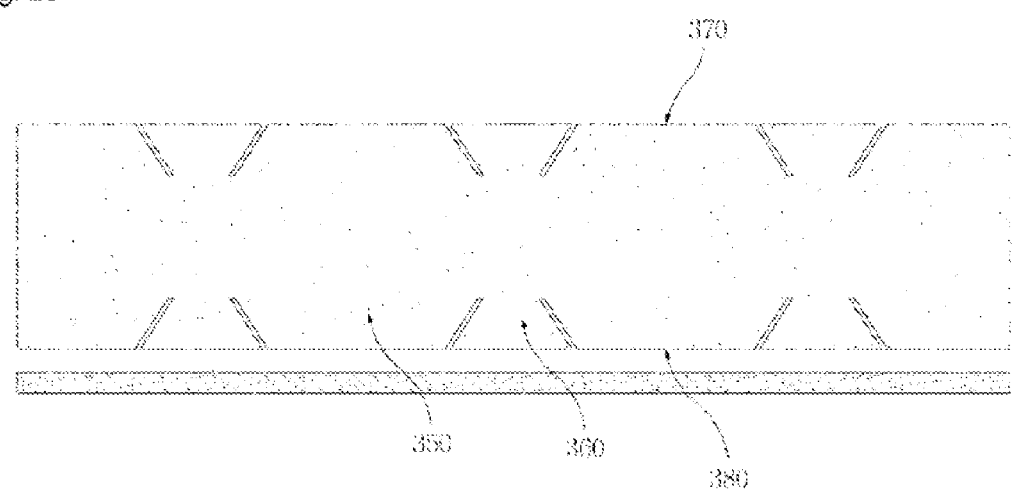
FIG. 26 is a cross sectional view showing a unit slit formed on the top surface and the bottom surface of a light guide plate of a backlight unit according to a third embodiment of the present invention.
Figure 27:
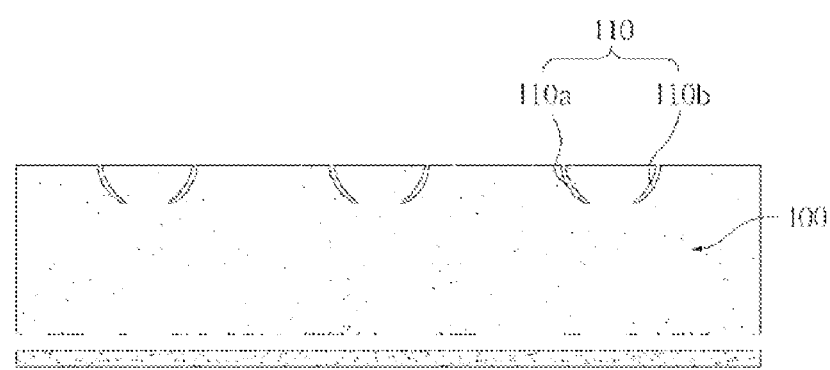
FIGS. 27 to 31 are cross sectional views showing a modified embodiment of a unit slit formed on the top surface of a light guide plate of a backlight unit according to a fourth embodiment of the present invention.
Figure 28:
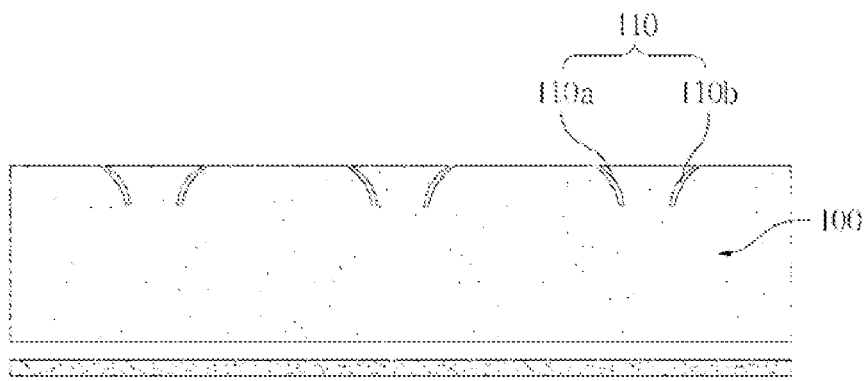
Figure 29:
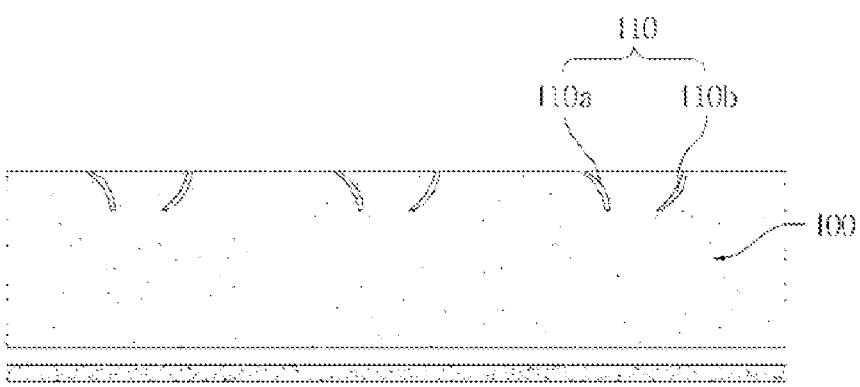
Figure 30:
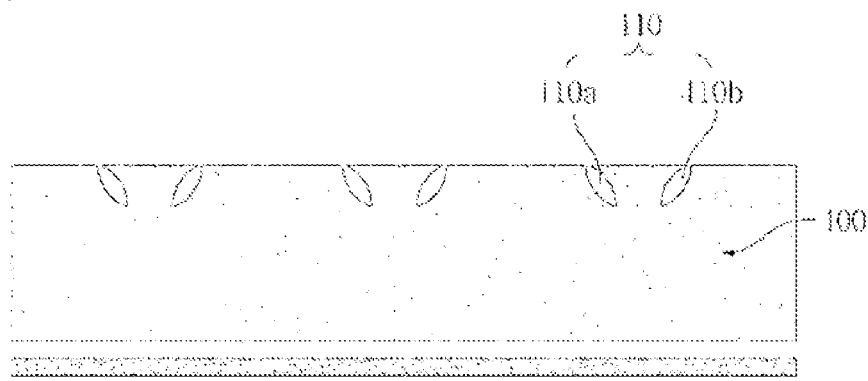
Figure 31:
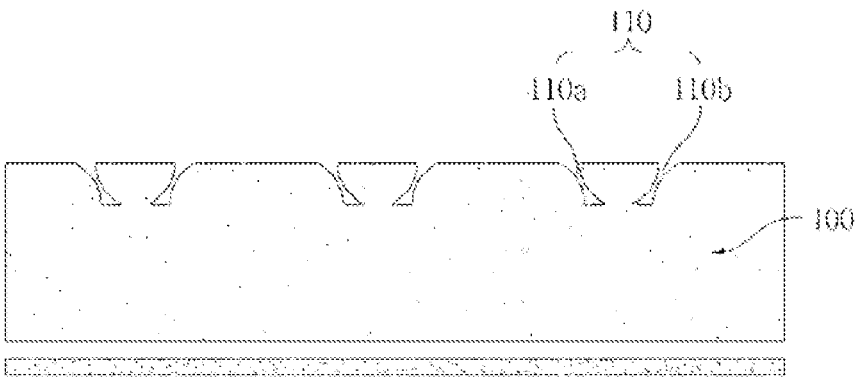

FIG. 26 is a cross sectional view showing unit slits formed on the top surface and the bottom surface of a light guide plate of a backlight unit according to a third embodiment of the present invention.

As shown in FIG. 26, a unit slit 360 formed in the light guide plate 350 of the backlight unit may be formed on the top surface 370 or the bottom surface 380 of the light guide plate 350. The unit slit 360 may be also formed on both the top surface 370 and the bottom surface 380. When the unit slit 360 is formed on both the top surface and the bottom surface of the light guide plate 350, the backlight unit can increase light emitting efficiency.

FIGS. 27 to 31 are cross sectional views showing a modified embodiment of a unit slit formed on the top surface of a light guide plate of a backlight unit according to a fourth embodiment of the present invention.

As shown in FIGS. 27 to 31, a unit slit 410 formed in a light guide plate 400 of the backlight unit includes a first slit 410a and a second slit 410b. In the cross section of one side of the unit slit 410, the first slit 410a and the second slit 410b are curved from the bottom surface toward inside of the light guide plate with respect to a vertical direction of the bottom surface. At the same time, the first slit 410a and the second slit 410b are symmetrical to each other with respect to the middle portion of the unit slit 410. As such, in the backlight unit, the unit slit 410 is curved, so that it is possible to precisely control emission angular distribution of light incident on the unit slit 410.

FIGS. 32 to 35 are views showing a modified embodiment of a shape of the top surface of a unit slit formed on a light guide plate of a backlight unit according to a fifth embodiment of the present invention.

Figure 32:
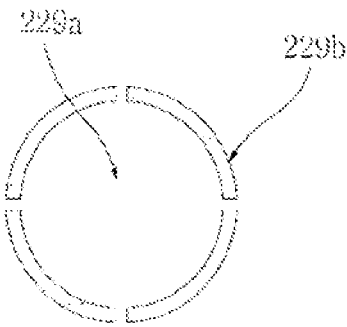
FIGS. 32 to 35 are views showing a modified embodiment of a shape of the top surface of a unit slit formed on a light guide plate of a backlight unit according to a fifth embodiment of the present invention.
Figure 33:
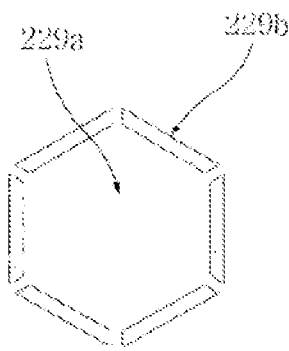
Figure 34:
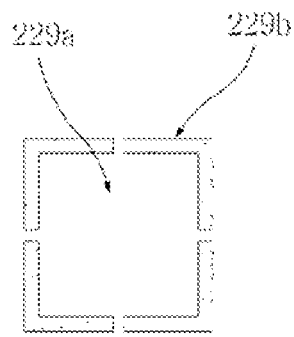
Figure 35:
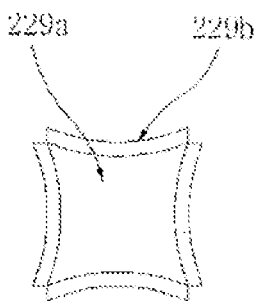

As shown in FIGS. 32 to 35, the unit slit formed in the light guide plate of the backlight unit can be configured to have segmented straight lines shown, in FIGS. 33 and 34 or segmented curved lines shown in FIGS. 32 and 35 as viewed from the top. As such, in the backlight unit, the unit slit is segmented, thereby more increasing the robustness of the unit slit.

Figure 36:
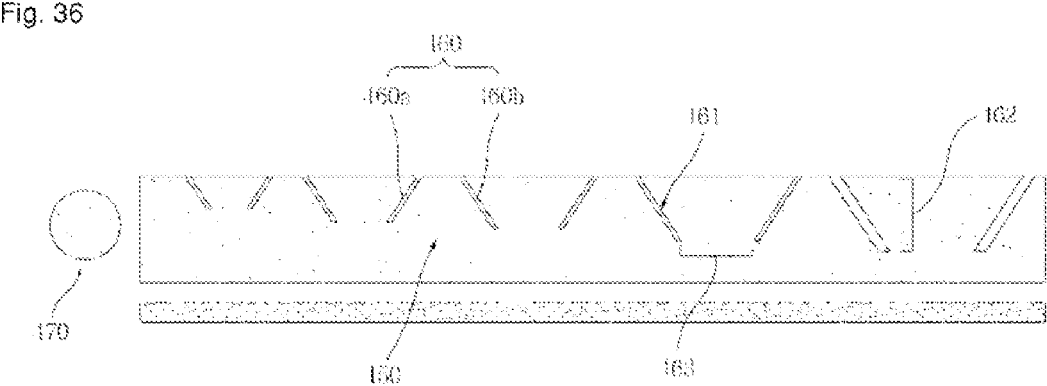
FIG. 36 is a cross sectional view showing a modified embodiment of a unit slit formed on a light guide plate of a backlight unit according to a sixth embodiment of the present invention.

FIG. 36 is a cross sectional view showing a modified embodiment of a unit slit formed on a light guide plate of a backlight unit according to a sixth embodiment of the present invention.

As shown in FIG. 36, the farther it is from a light source 470, the greater the height 462 of a unit slit 460 formed in a light guide plate 450 of the backlight unit is. That is, the farther it is from a light source 470, the greater the depth of the unit slit is. Here, it is required that the greater the height 462 of a unit slit 460 is, the greater a distance 463 between a first slit 460a and a second slit 460b is in correspondence with the height 462.

According to this backlight unit, an even light emission depth can be obtained over the entire surface of the light guide plate 450.

Figure 37:
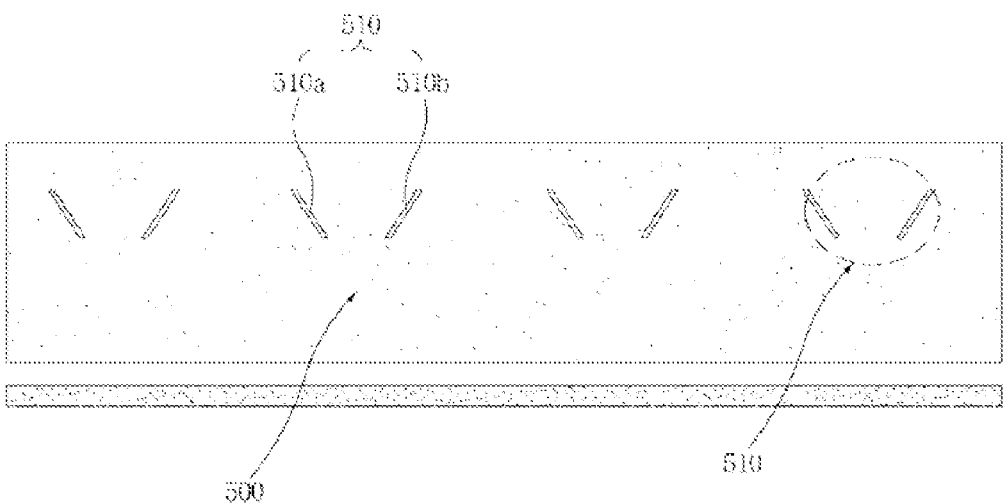
FIG. 37 is a cross sectional, view showing a structure of a light guide plate of a backlight unit according to a seventh embodiment of the present invention.

FIG. 37 is a cross sectional view showing a structure of a light guide plate of a backlight unit according to a seventh embodiment of the present invention.

As shown in FIG. 37, a unit slit 510 formed in a light guide plate 500 of the backlight unit can be configured to be buried within the light guide plate 500. More specifically, the inside of the light guide plate 500 of the backlight unit includes a plurality of unit slits 510 consisting of a first slit 510a and a second slit 510b. In the cross section of one side of the unit slit 510, the first slit 510a and the second slit 510b are inclined from the top to the bottom of the light guide plate with respect to a vertical direction of the top surface. At the same time, the first slit 510a and the second slit 510b are symmetrical to each other with respect to the middle portion of the unit slit 510.

According to this backlight unit, the unit slit 510 can be protected from the external impact and pollution of the light guide plate 500.

Figure 38:
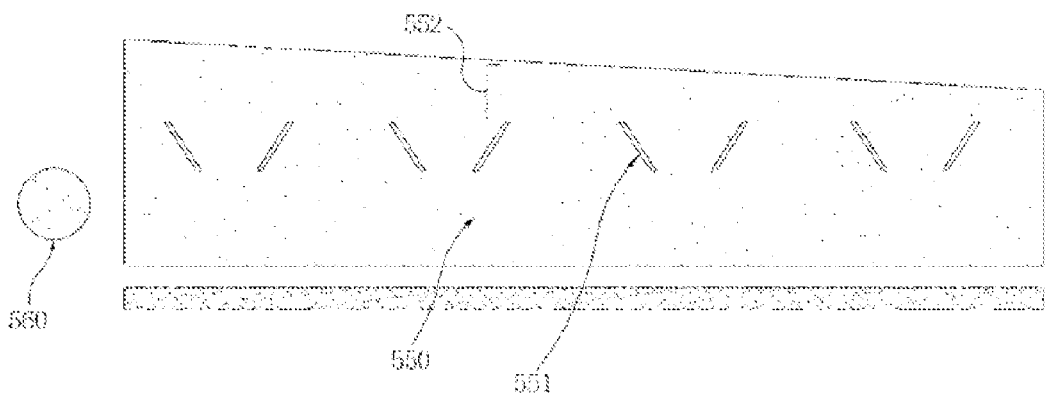
FIGS. 38 to 40 are cross sectional views showing a modified embodiment of the light guide plate of FIG. 37.
Figure 39:
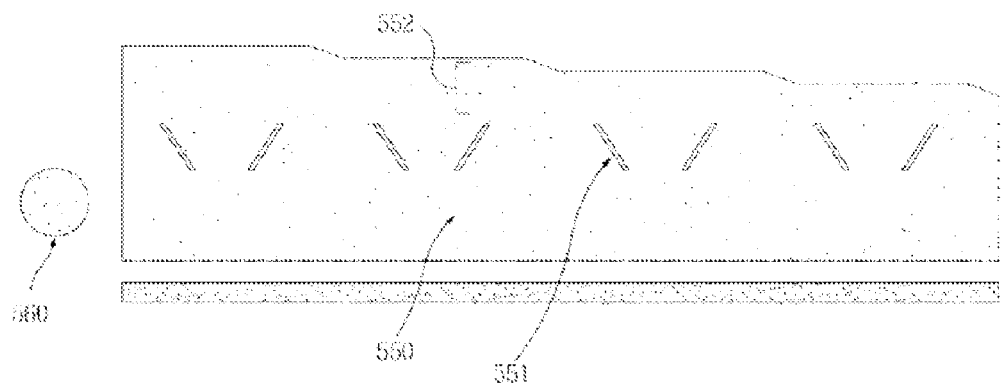
Figure 40:
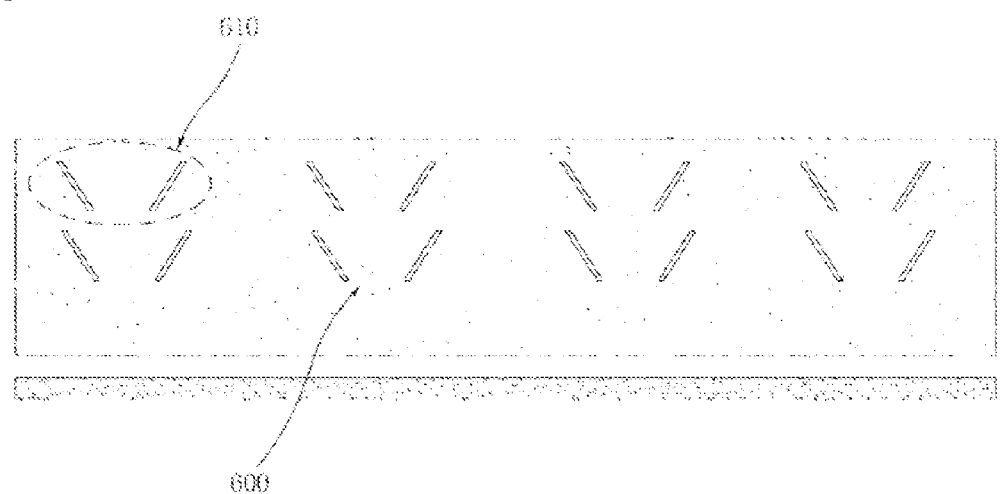

FIGS. 38 to 40 are cross sectional views showing a modified embodiment of the light guide plate of FIG. 37.

As shown in FIGS. 38 and 39, a light guide plate 550 of the backlight unit can be configured such that a distance 552 between the top surface of the light guide plate 550 and a unit slit 551 buried within the light guide plate 550 as shown in FIG. 37 is changeable according to a distance between a unit slit and a light source 560. FIG. 38 shows that the top surface of the light guide plate 550 is inclined downward toward the opposite side to the light source 560. FIG. 39 shows that the height of the top surface under where the unit slit 551 is placed is reduced toward the opposite side to the light source 560.

Therefore, through the light guide plate 550 of the backlight unit, the amount of light emitted from the light guide plate 550 can be uniform over the entire surface of the light guide plate 550.

As shown in FIG. 40, a light guide plate 600 of the backlight unit includes a plurality of multi-layered unit slits 610 buried within the light guide plate 600 like FIG. 37.

As such, the light guide plate of the backlight unit is formed such that the unit slits 610 form multi-layers, As a result, the density of the unit slit 610 is increased and light emitting efficiency is more improved.

Figure 41:
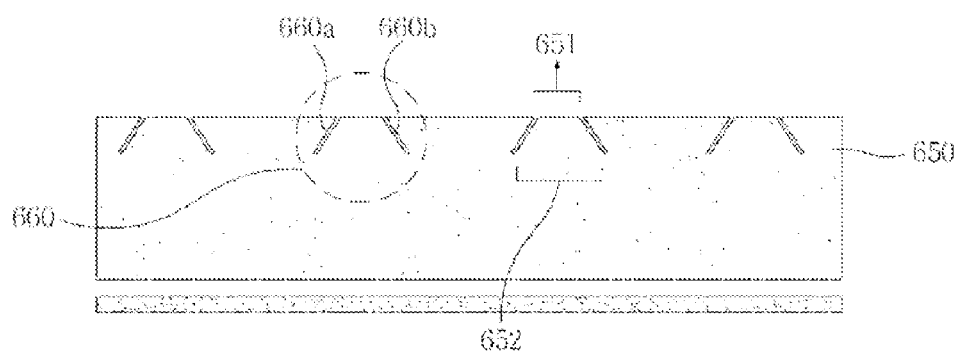
FIGS. 41 to 43 are cross sectional views showing a structure of a unit slit of a light guide plate of a backlight unit according to an eighth embodiment of the present invention.
Figure 42:
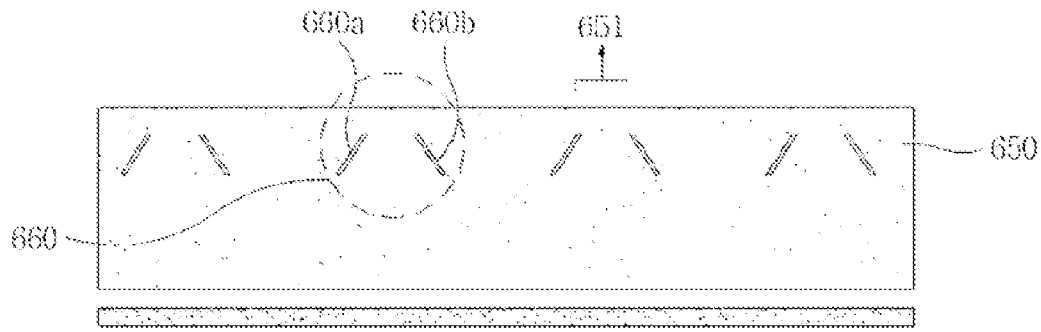
Figure 43:
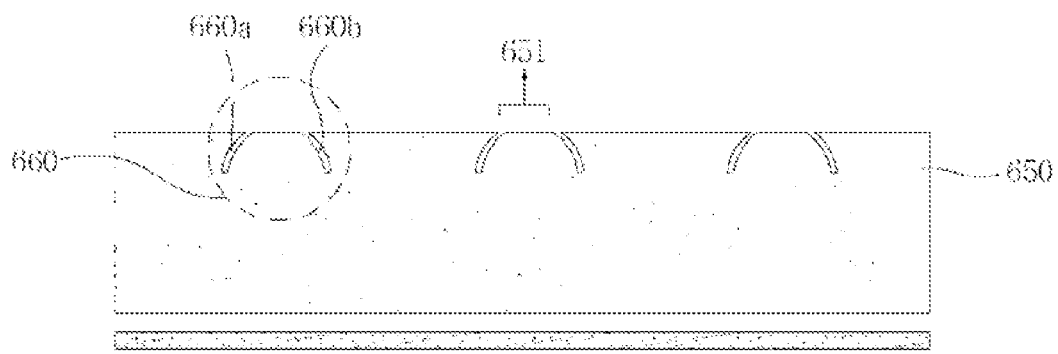

FIGS. 41 to 43 are cross sectional views showing a structure of a unit slit of a light guide plate of a backlight unit according to an eighth embodiment of the present invention. FIGS. 41 to 43 show modified structures of the unit slit of the first to the seventh embodiments of the present invention.

As shown in FIGS. 41 to 43, a distance between a first slit 660a and a second slit 660b of a unit slit 660 according to the eighth embodiment of the present invention becomes less toward the top surface of a light guide plate 650 (see reference number 651 of FIGS. 41 to 43) and becomes greater toward the inside of the light guide plate 650 (see reference number 652 of FIGS. 41 to 43). While the unit slits shown in the first to the third embodiments and the fifth to the seventh embodiments have a reverse trapezoidal shape, the unit slit 660 shown in FIGS. 41 to 43 has a trapezoidal shape.

Figure 44:
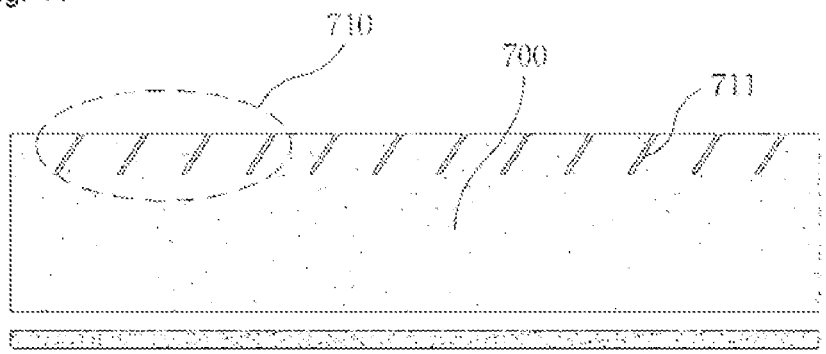
FIGS. 44 to 47 are cross sectional views showing a structure of a light guide plate of a backlight unit according to a ninth embodiment of the present invention.
Figure 45:
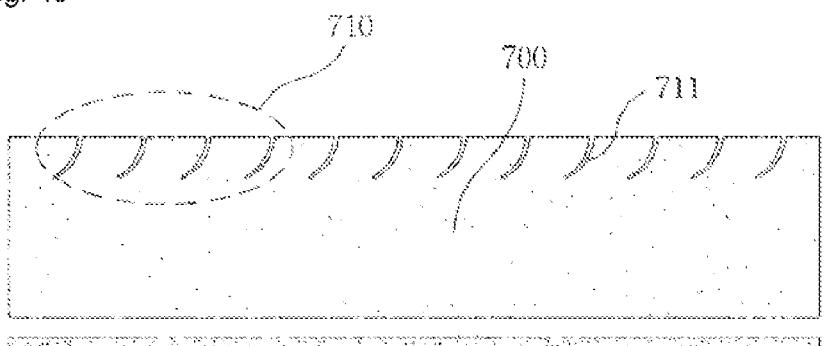
Figure 46:
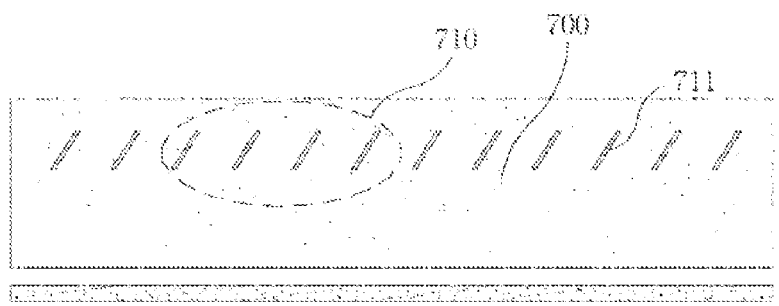
Figure 47:
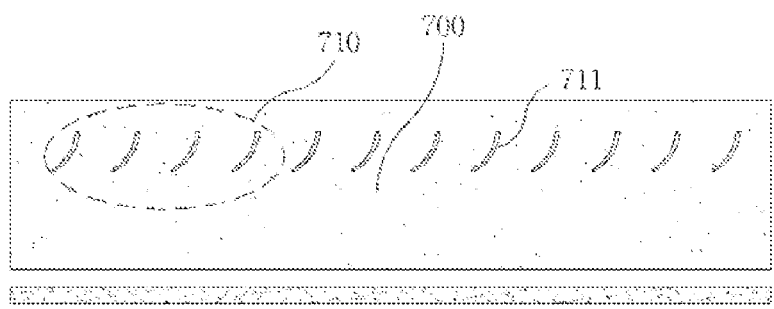

FIGS. 44 to 46 are cross sectional views showing a structure of a light guide plate of a backlight unit according to a ninth embodiment of the present invention. The FIGS. 44 to 47 show a modified embodiment of the unit slits including the first slit and the second slit which are inclined and face each other in the first to the eighth embodiments.

As shown in FIGS. 44 to 47, unit slits 711 formed in the light guide plate 700 of the backlight unit according to the ninth embodiment are formed to be inclined in only one direction instead of being inclined and facing each other. As such, in the backlight unit, the density of the unit silt 711 of the light guide plate can be freely increased, improving light emission efficiency.

Figure 48:
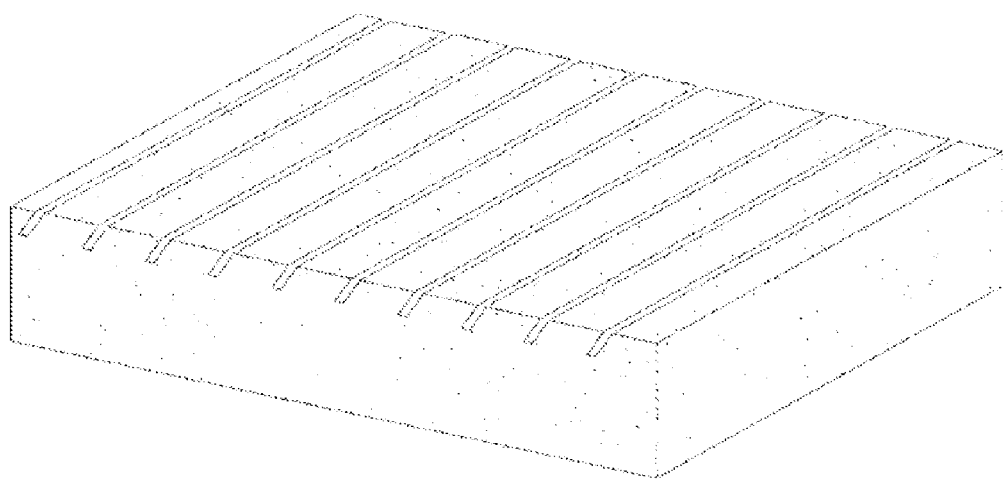
FIGS. 48 to 50 are perspective views showing a structure of the top surface of the light guide plate according to the ninth embodiment of the present invention.
Figure 49:
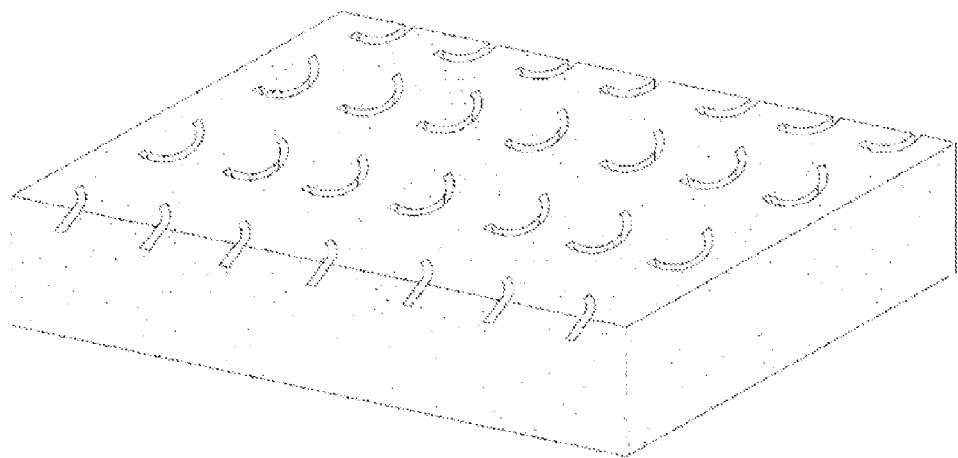
Figure 50:
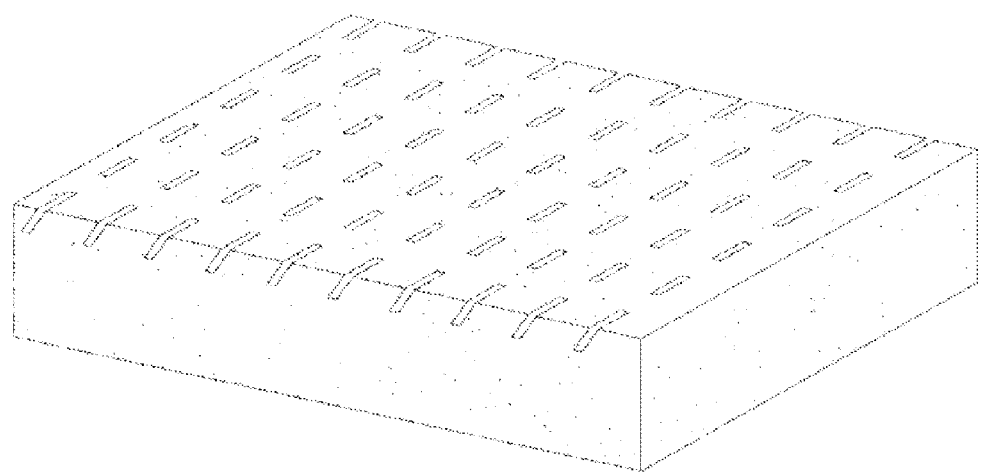

FIGS. 48 to 50 are perspective views showing a structure of the top surface of the light guide plate according to the ninth embodiment of the present invention.

As shown in FIGS. 48 to 50, the top surface of a light guide plate according to the ninth embodiment of the present invention is comprised of unit slits having a straight line shape of FIG. 48, a curved line shape of FIG. 49 and a segmented straight line shape of FIG. 50.

Figure 51:
FIGS. 51 to 53 are cross sectional views showing a structure of a light guide plate of a backlight unit according to a tenth embodiment of the present invention.
Figure 52:
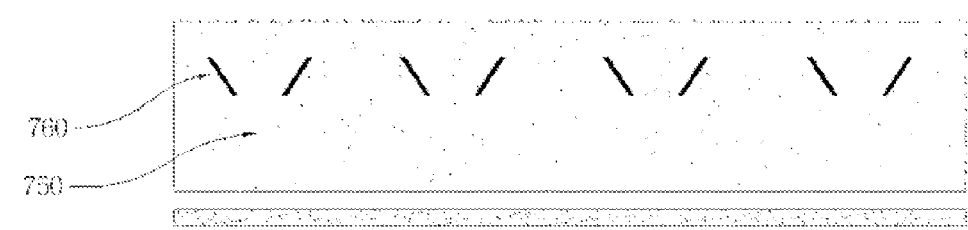
Figure 53:
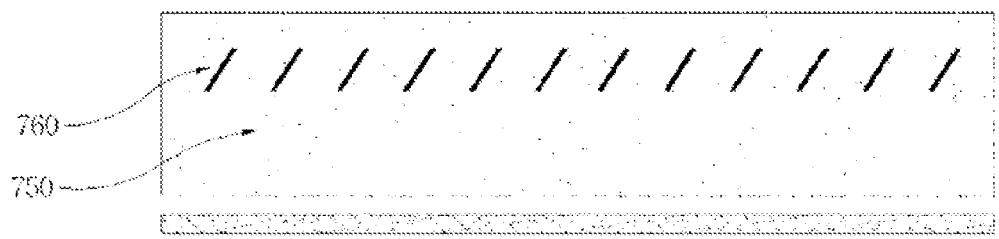

FIGS. 51 to 53 are cross sectional views showing a structure of a light guide plate of a backlight unit according to a tenth embodiment of the present invention.

As shown in FIGS. 51 to 53, a unit slit 760 formed in the light guide plate 750 of the backlight unit according to the tenth embodiment may be filled with a material other than air. Here, the material filled inside the unit slit 760 other than air is required to have a different refractive index from that of the light guide plate 750. According to this backlight unit, design flexibility of the backlight unit can be Increased by adjusting the refractive index difference between the unit slit 760 and the material of the light guide plate 750. Though FIGS. 51 to 53 show the unit slit is inclined, the unit slit may be curved without being limited to this.

Figure 54:
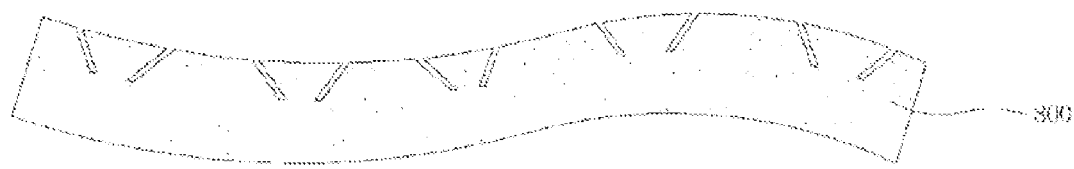
FIGS. 54 to 56 are cross sectional views showing a structure of a light guide plate of a backlight unit according to an eleventh embodiment of the present invention.
Figure 55:
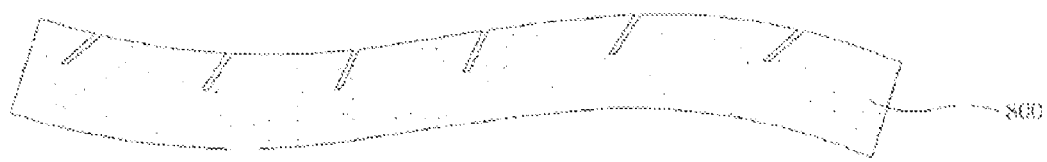
Figure 56:

FIGS. 54 to 56 are cross sectional views showing a structure of a light guide plate of a backlight unit according to an eleventh embodiment of the present invention.

As shown in FIGS. 54 to 56, a light guide plate of the backlight unit according to the eleventh embodiment of the present invention is manufactured with an elastic or flexible material and is easily curved. As such, in the backlight unit, the light guide plate 800 can be freely transformed and be applied to a product like a flexible display. Though FIGS. 54 to 56 show the unit slit is inclined, the unit slit may be curved without being limited to this.

Figure 57:
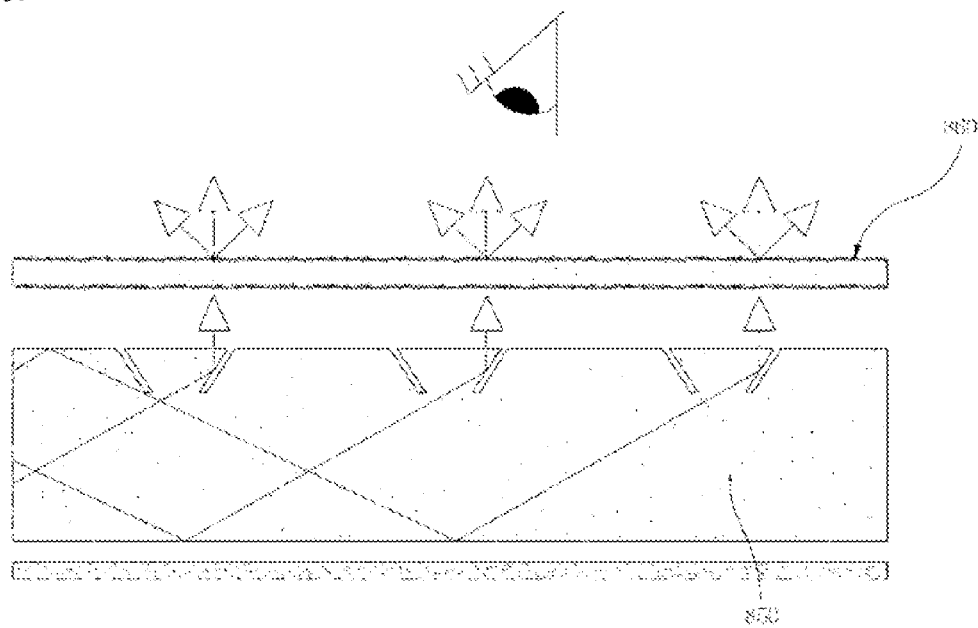
FIG. 57 is a cross sectional view showing a structure of a backlight unit according to a twelfth embodiment of the present invention.

FIG. 57 is a cross sectional view showing a structure of a backlight unit according to a twelfth embodiment of the present invention.

As shown in FIG. 57, a diffuser sheet or a scattering sheet 860 is disposed over a light guide plate 850 of the backlight unit according to the twelfth embodiment of the present invention. As such, in the backlight unit, the orientation angle distribution of light emitted from the light guide plate 950 is widened, so that a viewing angle of a display device can be improved. Though FIG. 57 shows the unit slit is inclined, the unit slit may be curved without being limited to this.

Figure 58:
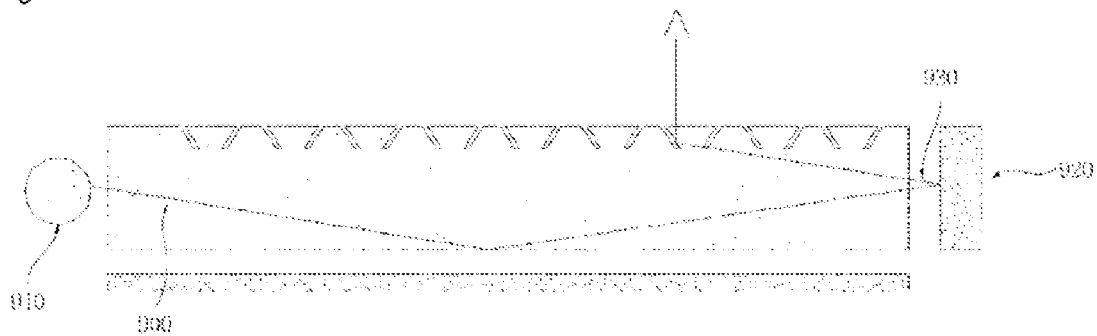
FIG. 58 is a cross sectional view showing a structure of a backlight unit according to a thirteenth embodiment of the present invention.
Figure 59:
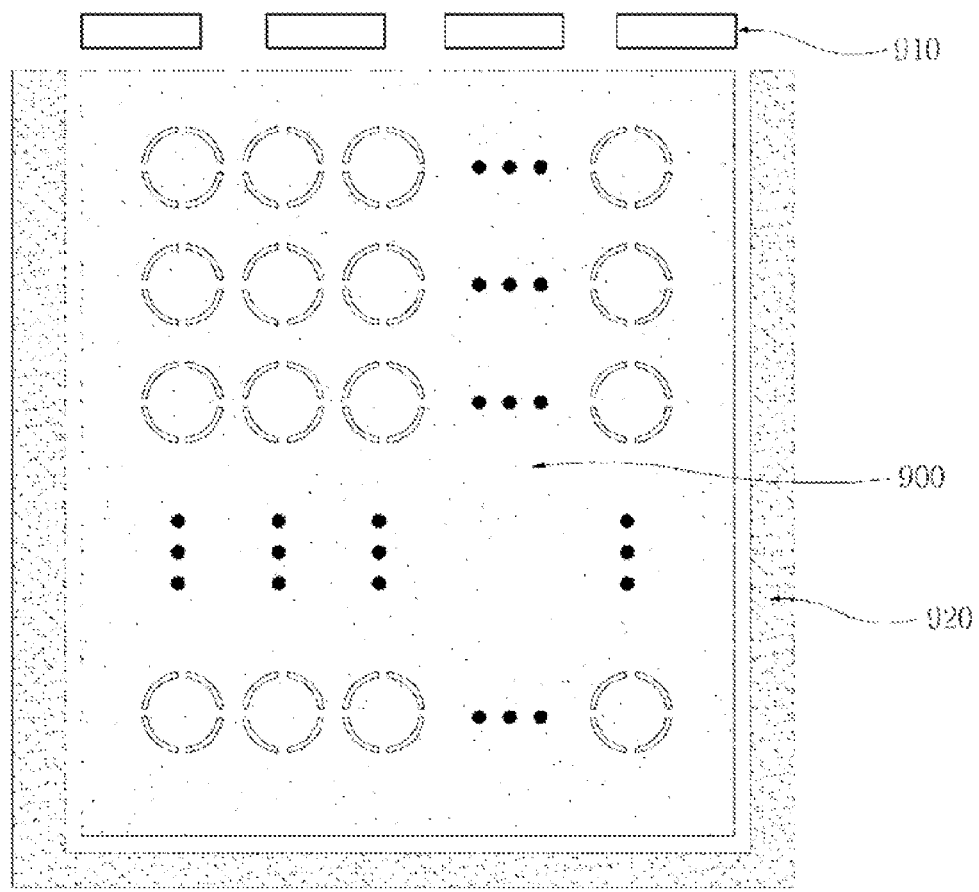
FIG. 59 is a plan view of the light guide plate of FIG. 58.

FIG. 58 is a cross sectional view showing a structure of a backlight unit according to a thirteenth embodiment of the present invention. FIG. 59 is a plan view of the light guide plate of FIG. 58.

As shown in FIGS. 58 and 59, in a light guide plate 900 of the backlight unit according to the thirteenth embodiment of the present invention, a reflective plate 920 is provided on at least one side among sides on which a light source 910 is not disposed. As such, in the backlight unit, it is possible to improve luminous efficiency by reusing light emitted from the side on which the light source 910 is not disposed. Though FIGS. 58 and 59 show the unit slit is inclined, the unit slit may be curved without being limited to this.

Figure 60:
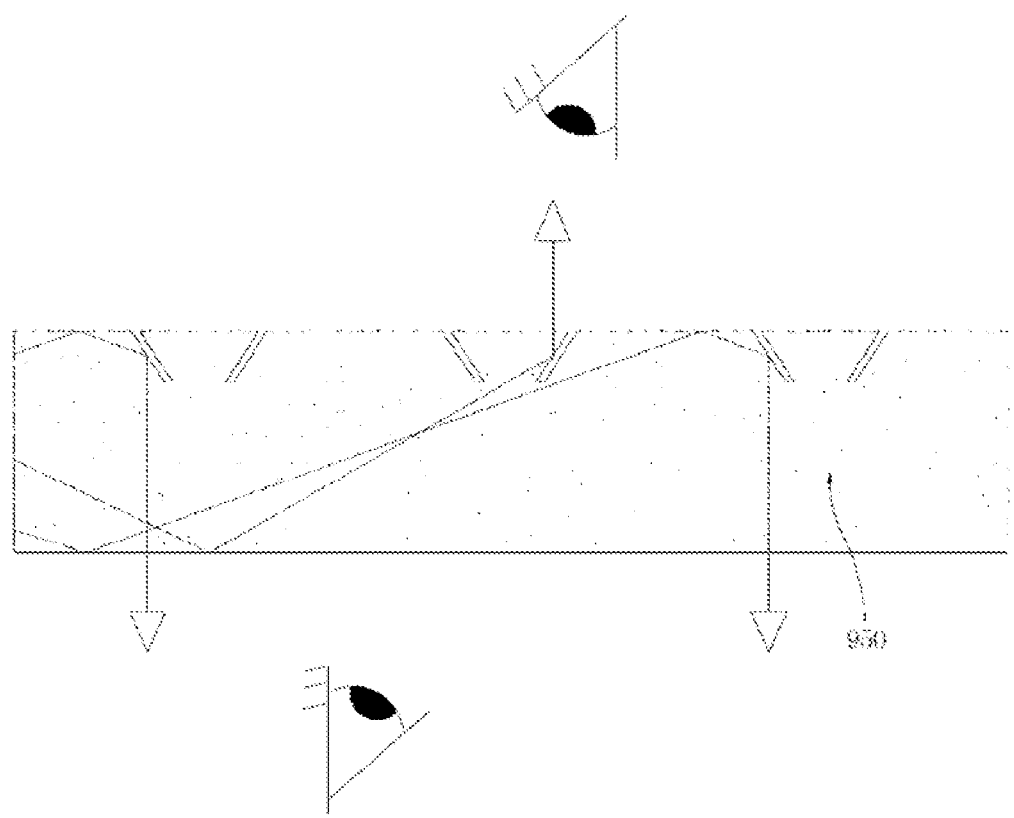
FIG. 60 is a cross sectional view showing a structure of a backlight unit according to a fourteenth embodiment of the present invention.

FIG. 60 is a cross sectional view showing a structure of a backlight unit according to a fourteenth embodiment of the present invention.

As shown in FIG. 60, when light is necessary to be emitted in both directions, it is possible to apply the backlight unit by removing a reflective plate placed under the light guide plate 950 of the backlight unit according to the fourteenth embodiment of the present invention.

As such, it can be understood by those skilled in the art that technical configurations of the present invention can be embodied in other specific forms without changing its spirit or essential characteristics of the present invention.

Therefore, the foregoing embodiments and advantages are merely exemplary and are not to be construed as limiting the present invention. The present teaching can be readily applied to other types of apparatuses. The description of the foregoing embodiment is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

The invention claimed is:

1. A backlight unit comprising:
   a light guide plate;
   a light source disposed on one side of the light guide plate; and
   a reflective plate disposed under the light guide plate,
   wherein the light guide plate comprises a plurality of unit slits comprising a first slit and a second slit, wherein, in the cross section of one side of the unit slit, the first slit and the second slit are inclined from a top surface of the light guide plate toward an inside of the light guide plate with respect to a vertical direction of the top surface,
   wherein the first slit and the second slit are symmetrical to each other with respect to the middle portion of each unit slit, and
   wherein each unit slit is configured such that when light is incident on one of the first slit and the second slit, the light is totally reflected by the one of the first slit and the second slit, and the totally reflected light is emitted from the light guide plate in a perpendicular direction with respect to the top surface.

2. The backlight unit of claim 1, wherein the unit slit has at least one shape, comprising a line shape, a circular shape, a polygonal shape, a shape of an irregular closed curve and a crescent shape, on the top surface of the light guide plate.

3. The backlight unit of claim 2, wherein each of the line shape, circular shape, polygonal shape, shape of an irregular closed curve and crescent shape is segmented within itself.

4. The backlight unit of claim 1, wherein, in the light guide plate, the farther it is from the light source, the less a distance between one unit slit and another unit slit adjacent to the one unit slit is.

5. The backlight unit of claim 1, wherein, in the light guide plate, the farther it is from the light source, the greater the height of a unit slit is.

6. The backlight unit of claim 1, wherein internal widths of the first slit and the second slit are constant.

7. The backlight unit of claim 1, wherein, in the first slit and the second slit, upper widths are greater or less than lower widths.

8. The backlight unit of claim 1, wherein the light guide plate comprises at least one of Poly MethylMethacrylAte (PMMA), Poly Carbonate (PC), PolyDiMethylSiloxane (PDMS).

9. The backlight unit of claim 1, wherein the unit slit is formed on the bottom surface of the light guide plate.

10. The backlight unit of claim 1, wherein the unit slit is filled with a material having a different refractive index from that of the light guide plate.

11. The backlight unit of claim 1, wherein a diffuser sheet or a scattering sheet is disposed over the light guide plate.

12. The backlight unit of claim 1, wherein a reflective plate is disposed on the other side of the light guide plate.

13. The backlight unit of claim 1, wherein the light source is a cold cathode fluorescent lamp or a light emitting diode.

14. The backlight unit of claim 1 wherein the light guide plate is made of an elastic material.

15. A backlight unit comprising:
   a light guide plate;
   a light source disposed on one side of the light guide plate; and
   a reflective plate disposed under the light guide plate,
   wherein the light guide plate comprises a plurality of unit slits which, in the cross section of one side of the unit slit, are parallel with each other and are inclined from a top surface of the light guide plate toward the inside of the light guide plate with respect to a vertical direction of the top surface, and
   wherein each unit slit is configured such that when light is incident on the unit slit, the light is totally reflected by the unit slit, and the totally reflected light is emitted from the light guide plate in a perpendicular direction with respect to the top surface or a bottom surface of the light guide plate.

* * * * *